(12) United States Patent  
Kwon et al.

(10) Patent No.: US 11,054,688 B2  
(45) Date of Patent: Jul. 6, 2021

(54) DISPLAY DEVICE

(71) Applicant: SAMSUNG ELECTRONICS CO., LTD., Suwon-si (KR)

(72) Inventors: Yong-Hun Kwon, Suwon-si (KR); Youngchol Lee, Suwon-si (KR); Keunbum Lee, Suwon-si (KR); Seungjae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/997,485

(22) Filed: Aug. 19, 2020

(65) Prior Publication Data

US 2021/0088833 A1 Mar. 25, 2021

(30) Foreign Application Priority Data

Sep. 23, 2019 (KR) .......................... 10-2019-0116684

(51) Int. Cl.
*G02F 1/1335* (2006.01)

(52) U.S. Cl.
CPC .. *G02F 1/133504* (2013.01); *G02F 1/133526* (2013.01); *G02F 1/133536* (2013.01); *G02F 1/133553* (2013.01)

(58) Field of Classification Search
CPC ......... G02F 1/133606; G02F 1/133504; G02F 1/133526; G02F 1/133536; G02F 1/133553; F21K 9/69; G02B 19/0061; H01L 33/50

USPC .................................................... 349/61–71
See application file for complete search history.

(56) References Cited

U.S. PATENT DOCUMENTS

| 8,106,859 B2 * | 1/2012 | Ohkawa ............ G02F 1/133603 |
| | | 345/82 |
| 2012/0105739 A1* | 5/2012 | Shimizu ............ G02F 1/133606 |
| | | 348/790 |
| 2020/0159071 A1* | 5/2020 | Yoon ......................... F21K 9/69 |

FOREIGN PATENT DOCUMENTS

| KR | 1020170013696 A | 2/2017 |
| KR | 1020190053312 A | 5/2019 |

OTHER PUBLICATIONS

Communication dated Feb. 1, 2021 issued by the European Patent Office in European Application No. 20191193.0.

* cited by examiner

*Primary Examiner* — Charles S Chang  
(74) *Attorney, Agent, or Firm* — Sughrue Mion, PLLC

(57) ABSTRACT

Provided is a display device. The display device includes a display panel; a light source configured to emit light toward the display panel; a diffuser plate configured to diffuse incident light and disposed between the light source and the display panel; an optical lens configured to diffuse the light emitted by the light source; and at least one support provided adjacent to an edge of the optical lens and protruding toward the diffuser plate, the optical lens being integrally formed with the at least one support.

20 Claims, 12 Drawing Sheets

DISPLAY DEVICE

CROSS-REFERENCE TO RELATED APPLICATION

This application is based on and claims priority under 35 U.S.C. § 119 to Korean Patent Application No. 10-2019-0116684 filed on Sep. 23, 2019, the disclosure of which is incorporated by reference herein in its entirety.

BACKGROUND

1. Field

The disclosure relates to a display device, and more particularly, to a display device including a backlight unit having an optical lens.

2. Description of Related Art

A display device is a kind of output device for visually presenting data information and images, such as text or figures. Examples of display devices include televisions, various kinds of monitors, many different kinds of portable terminals (e.g., notebooks, tablet personal computers (PCs), and smart phones), etc.

A display device may be classified into an emissive type that uses a self-emissive display panel, such as organic light emitting diodes (OLEDs), and a non-emissive type that uses a display panel unable to emit light by itself but requires light from a backlight unit, such as a liquid crystal display (LCD) panel.

The backlight unit may be classified, based on position of the light source, into a direct type with the light source positioned behind the display panel and an edge type with the light source positioned along the edges of the display panel.

A direct LED backlight unit includes an optical lens, and to retain characteristics of the optical lens, the display device needs to maintain a certain optical distance (OD) between the optical lens and a diffuser plate receiving light emitted from the optical lens. In order to maintain the light diffusivity of the optical lens, the optical distance between the optical lens and the diffuser plate must be maintained.

SUMMARY OF THE DISCLOSURE

Provided is a display device that may help reduce manufacturing costs.

Also provided is a display device with an enhanced manufacturing process.

Also provided is a display device with an enhanced light diffusion property.

According to an aspect of the disclosure, a display device includes a display panel; a light source configured to emit light toward the display panel; a diffuser plate configured to diffuse incident light and disposed between the light source and the display panel; an optical lens configured to diffuse the light emitted by the light source; and at least one support provided adjacent to an edge of the optical lens and protruding toward the diffuser plate, the optical lens being integrally formed with the at least one support.

The at least one support may be configured to support the diffuser plate when the diffuser plate is deformed by heat.

The at least one support may contact the diffuser plate when the diffuser plate is in an non-deformed state.

The optical lens may include a rear surface defining a depression configured to receive the light source; and a reflecting portion defining a reflecting surface located in front of the depression. The reflecting surface may be configured to reflect light emitted from the light source.

The reflecting surface may include a first reflecting surface inclined in a radial direction of the optical lens; and a second reflecting surface, inclined in the radial direction of the optical lens at a different angle than the first reflecting surface.

The first reflecting surface and the second reflecting surface may incline towards a front of the optical lens as the first reflecting surface and the second reflecting surface extend radially outward.

The optical lens may include a diffuser portion extending in a radial direction, the diffuser portion being inclined towards a back of the optical lens as the diffuser portion extends radially outward.

The at least one support may be located on the diffuser portion.

The at least one support may include a first support; a second support positioned along an edge of the optical lens at a distance from the first support; and a third support positioned along the edge of the optical lens, the third support being separated from the second support by a distance equal to the distance between the first support and the second supports, The third support may be separated from the first support by a distance equal to the distance between the third support and the second support.

The at least one support may extend along a peripheral edge of the optical lens.

The at least one support may be shaped as one of a cone, a cylinder, a square pillar, and a quadrangular pyramid.

The at least one support may be configured to prevent a distance between the optical lens and the diffuser plate from being shorter than a preset distance.

The at least one support may have length corresponding to an optical distance between the optical lens and the diffuser plate to retain optical properties of the optical lens.

According to another aspect of the disclosure, a display device includes a display panel, a light source configured to supply light to the display panel, an optical member disposed between the light source and the display panel, and an optical lens configured to diffuse light emitted from the light source. The optical lens may include a reflecting portion defining a forward-facing reflecting surface inclined towards a front to the optical lens as the reflecting portion extends radially outward and a diffuser portion located radially outside of the reflecting portion. The diffuser portion may be inclined towards a back of the optical lens as the diffuser portion extends radially outward. The optical lens may also include at least one support protruding from an edge of the optical lens toward the optical member.

The at least one support may be configured to support the diffuser plate.

The at least one support may include a first support and a second support arranged along the edge of the optical lens. The second support may be separated from the first support by a distance.

The at least one support may have a length corresponding to a distance between the optical member and the optical lens to retain optical properties of the optical lens.

The at least one support may be shaped as one of a cone, a cylinder, a square pillar, and a quadrangular pyramid.

The optical member may include at least one of a diffuser plate, a quantum dot sheet, a diffuser sheet, a prism sheet, a protection sheet, or a reflective polarizing sheet.

According to yet another aspect of the disclosure, a display device may include a display panel, a light source configured to supply light to the display panel, a diffuser plate disposed between the light source and the display panel, and an optical lens configured to diffuse light emitted from the light source, the optical lens being integrally formed with a support protruding toward the diffuser plate from an edge of the optical lens.

The support may be configured to prevent a variation in distance between the optical lens and the diffuser plate that will cause optical properties of the optical lens to change.

BRIEF DESCRIPTION OF THE DRAWINGS

The above and other aspects, features and advantages of certain embodiments of the present disclosure will become more apparent from the following description taken in conjunction with the accompanying drawings, in which.

DETAILED DESCRIPTION

The embodiments of the present disclosure will now be described with reference to the drawings. In this regard, embodiments may have different forms and should not be construed as being limited to the descriptions set forth herein.

As used herein, the singular forms "a", "an" and "the" are intended to include the plural forms as well, unless the context clearly indicates otherwise. For the sake of clarity, the elements of the drawings may be drawn with exaggerated forms and sizes.

It will be further understood that the terms "includes," "comprises," and/or "have," when used in this specification, specify the presence of stated features, integers, steps, operations, elements, and/or components, but do not preclude the presence or addition of one or more other features, integers, steps, operations, elements, components, and/or groups thereof.

Figure 1:
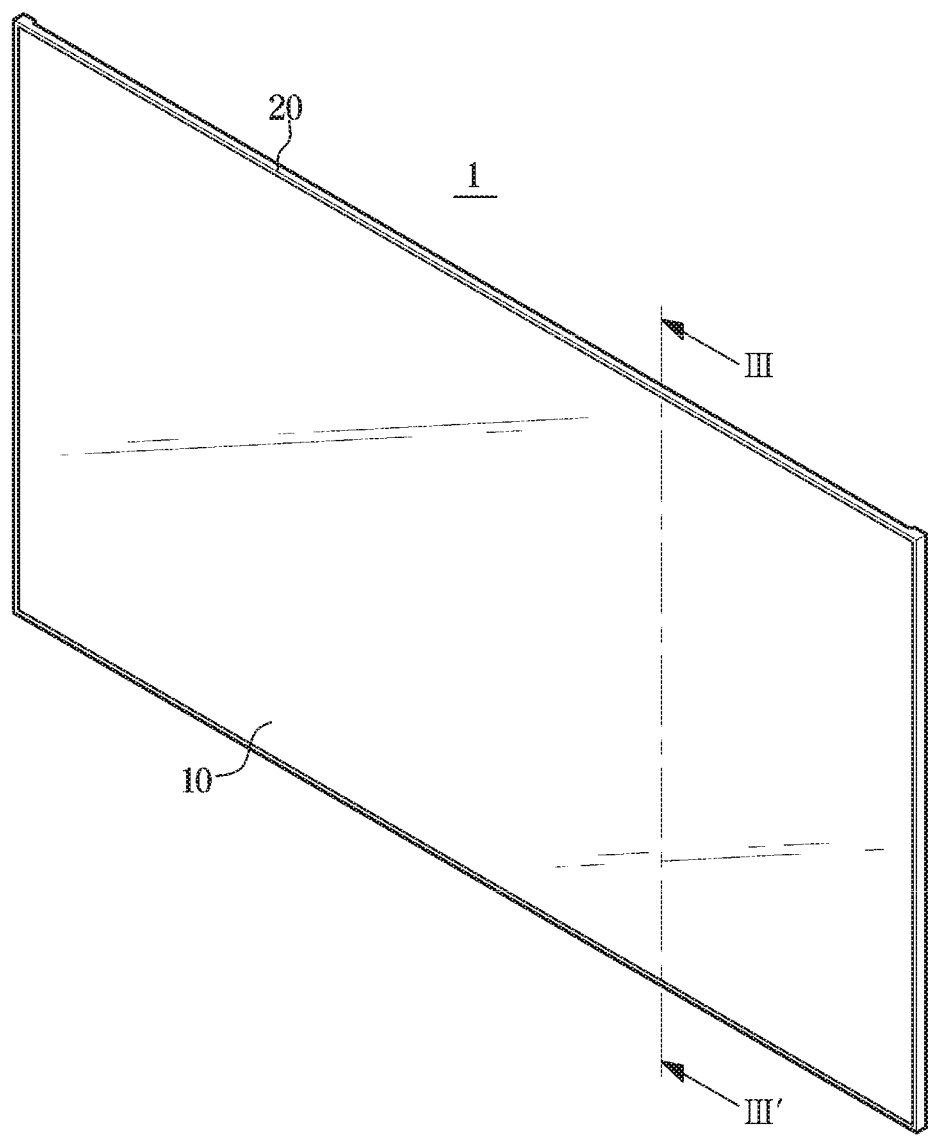
FIG. 1 shows a display device, according to an embodiment.

Directions "front", "back (or rear)", "top", "bottom", "left", and "right" will be defined throughout the specification with respect to the directions shown in FIG. 1. In FIG. 1, X-, Y-, and Z-axes perpendicular to one another are shown, where the X-axis represents the direction of a long side 11 of a display panel 10, the Y-axis represents the direction of a short side 12 of the display panel 10, and the Z-axis represents a front-back direction.

Figure 2:
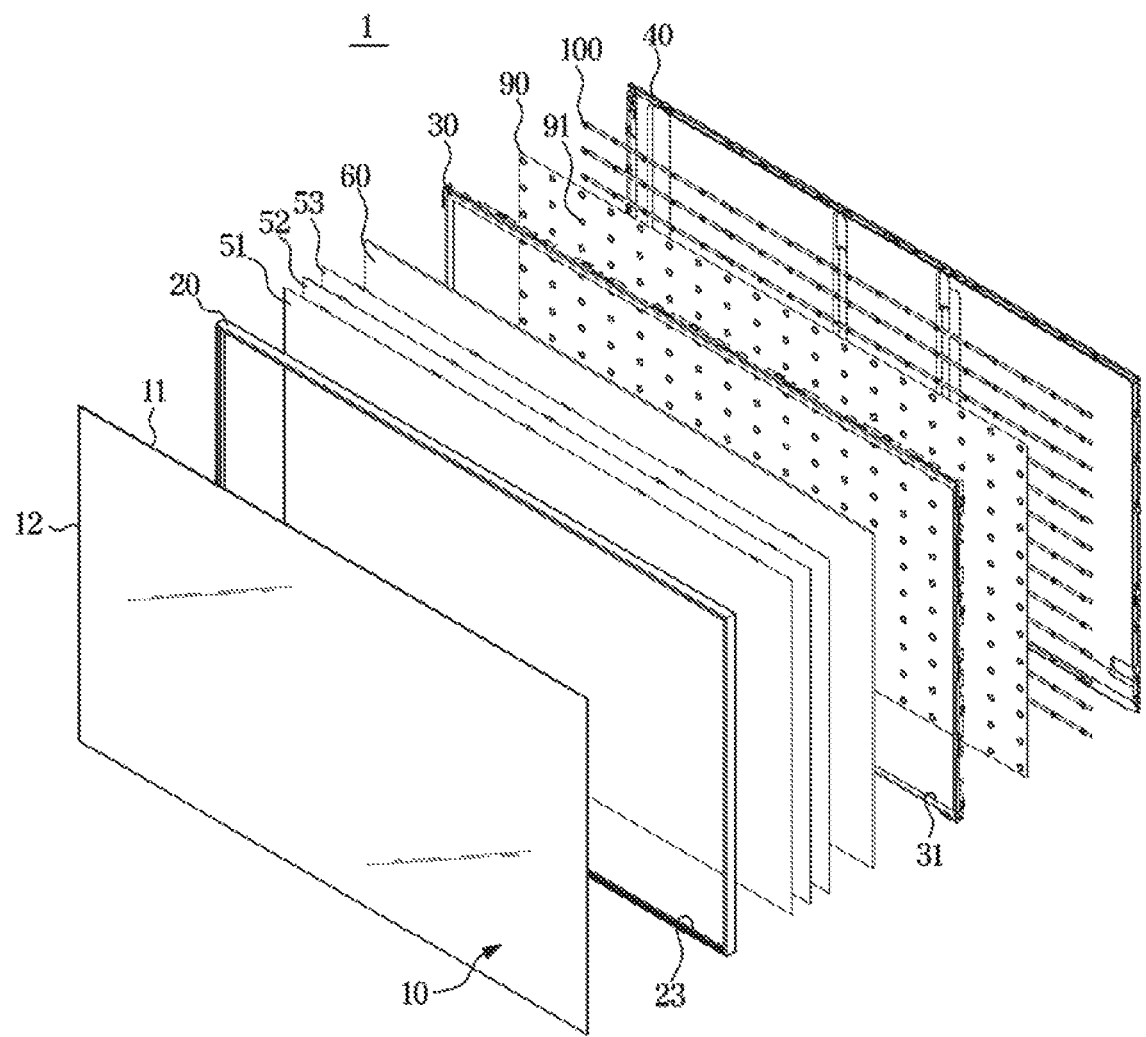
FIG. 2 is an exploded view of the display device of FIG. 1.
Figure 3:
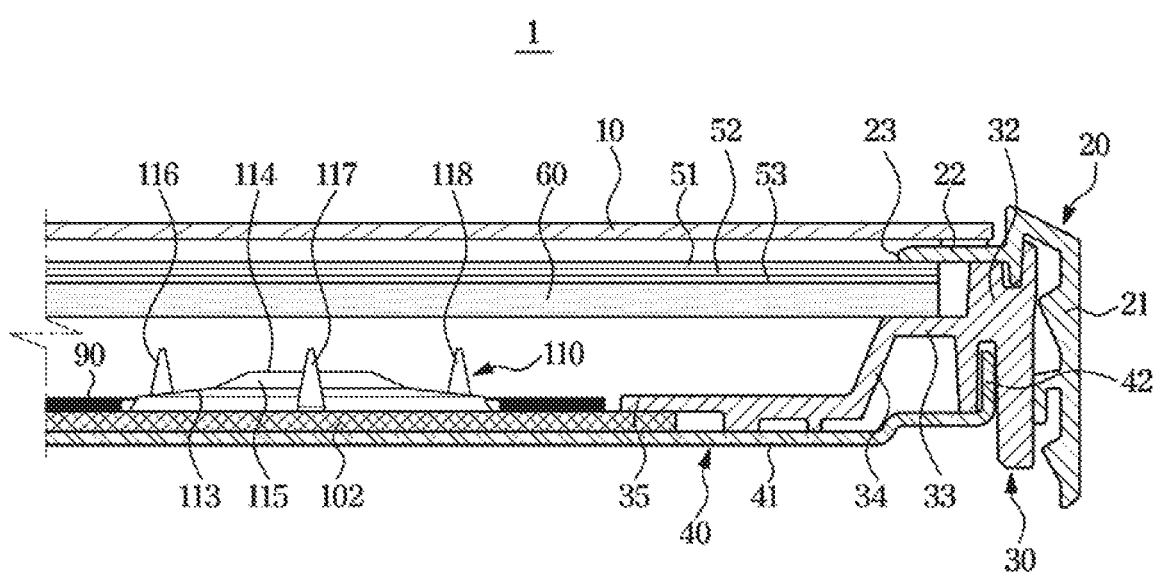
FIG. 3 shows portion of a side cross-sectional view of the display device of FIG. 1, the cross-section being taken along line III-III'.

In the drawings, like reference numerals refer to like elements throughout. Further, in the drawings, unrelated parts may be not shown and the sizes of components may be exaggerated for clarity. FIG. 1 shows a display device, according to an embodiment. FIG. 2 is an exploded view of the display device of FIG. 1. FIG. 3 shows part of a side cross-sectional view of the display device of FIG. 1.

Referring to FIGS. 1, 2, and 3, a display device according to an embodiment will be described.

A display device 1 may include a display panel 10 for displaying an image, a backlight unit arranged behind the display panel 10 for supplying light to the display panel 10, and a chassis assembly for supporting the backlight unit and the display panel 10.

The chassis assembly may include a rear chassis 40 equipped to support the backlight unit, a front chassis 20 arranged in front of the rear chassis 40 to support the display panel 10, and a middle mold 30 coupled between the front chassis 20 and the rear chassis 40. The chassis assembly may receive and support the display panel 10.

The display panel 10 may include a thin-film transistor substrate with thin-film transistors arranged thereon in the form of a matrix, a color-filter substrate coupled in parallel with the thin-film transistor substrate, and liquid crystal injected between the thin-film transistor substrate and the color-filter substrate. The liquid crystal may have optical properties that vary based on changes in voltage or temperature.

The backlight unit may be arranged behind the display panel 10 to emit light onto the display panel 10. The backlight unit may include a light source module 100 including one or more light source(s) 101 (see FIG. 6), a substrate 102 with the light source(s) 101 mounted thereon and an optical lens 110 for diffusing light emitted from the light source 101, and optical members arranged along a path of the light emitted from the light source 101. The display device may include a plurality of light source modules 100 separated from each other.

A plurality of light sources 101 may be mounted on the substrate 102 in a straight line. A driving power line may be provided on the substrate 102 to supply driving power to the light sources 101 and connected to a signal cable and a backlight driving circuit. The substrate 102 may be disposed in the chassis assembly.

Light emitting diodes (LEDs) may be used as the light sources 101. In addition, a cold cathode fluorescent lamp (CCFL) or an external electrode fluorescent lamp (EEFL) may be used as the light source.

The optical members may be arranged along a path of the light emitted from the light source 101 to guide propagation of the light, reflect the light, diffuse the light, or enhance the optical properties of the output light.

The optical members may include a reflector sheet 90 for reflecting light to prevent loss, a diffuser plate 60 for uniformly diffusing irregular light emitted from the light sources 101, a quantum dot sheet 53 for enhancing color reproducibility by changing wavelengths of light, and optical sheets 51 and 52 for enhancing optical properties of the output light.

The reflector sheet 90 may reflect light emitted from the light sources 101 or light output backward from the diffuser plate 60 to the diffuser plate 60. The reflector sheet 90 may be placed on the substrate 102. The reflector sheet 90 may stick to the substrate 102. The reflector sheet 90 may have through holes 91 formed for the light sources 101 to pass through.

The diffuser plate 60 may uniformly diffuse the irregular light emitted from the light sources 101, as well as support the quantum dot sheet 53 and the optical sheets 51 and 52. The diffuser plate 60 may uniformly diffuse the light incident on its incident surface that is output through its output surface.

The quantum dot sheet 53 may be arranged in front of the diffuser plate 60 at a certain distance from the diffuser plate 60. Quantum dots, which may be illuminant semiconductor crystals having a diameter of a few nanometers, may be distributed inside the quantum dot sheet 53. The quantum dots may receive blue light to produce all colors of visible light depending on the size of the quantum dots. A smaller quantum dot may produce a shorter wavelength of the light while a larger quantum dot may produce a longer wavelength of light.

The optical sheets 51 and 52 may be positioned in front of the diffuser plate 60 to enhance optical properties of the light output from the diffuser plate 60. The optical sheets 51 and 52 may include a diffuser sheet for offsetting a pattern of the diffuser plate 60, a prism sheet for concentrating the light to enhance brightness, a protection sheet for protecting the other optical sheets against an external shock or inflow of foreign materials, a reflective polarizing sheet (e.g., dual brightness enhancement film (DBEF)) for transmitting polarized light while reflecting differently polarized light to enhance brightness, etc.

The rear chassis 40 may be arranged behind the backlight unit. The rear chassis 40 may be shaped generally like a plate with the edges bending forward. The backlight unit may be disposed between the front chassis 20 and the rear chassis 40.

The rear chassis 40 may include a rear base 41 on which the light source module 100 is disposed, and a rear-side 42 formed on the top, bottom, left and right edges of the rear chassis 40 to be coupled with the middle mold 30.

The rear chassis 40 may radiate heat generated from a heating element, such as the light source module 110 to the outside. For this, the rear chassis 40 may be formed of aluminum, various types of metals and alloys such as stainless steel, or plastics such as ABS.

The front chassis 20 may be shaped as a frame with an opening 23 for the light from the backlight unit to be provided to the display panel 10. The front chassis 20 may include a front-side 21 formed on the top, bottom, left and right edges of the front chassis 20 for coupling with the middle mold 30, and a panel support 22 protruding inward from the front-side 21 to support the display panel 10.

The middle mold 30 may support the diffuser plate 60 and reflect light emitted from the light source module 100 to the diffuser plate 60. The middle mold 30 may maintain a distance between the diffuser plate 60 and the light source module 100. The middle mold 30 may be coupled between the front chassis 20 and the rear chassis 40.

The middle mold 30 may be shaped like a frame with an opening 31. The light source module 100 may be disposed in the opening 31. The middle mold 30 may include a frame 32 to which the front chassis 20 and the rear chassis 40 are coupled, a diffuser plate support 33 protruding inward from the frame 32 to support the diffuser plate 60, a middle reflector 34 extending from the diffuser plate support 33 to reflect light, and a substrate support 35 extending from the middle reflector 34 to support the substrate 102.

The frame 32 may be disposed on top, bottom, left, and right edges of the middle mold 30. The frame 32 may be coupled to the front chassis 20 and the rear chassis 40 in various known fitting and coupling structures and with extra fastening members.

The diffuser plate support 33 may protrude inward from the frame 32 to support the diffuser plate 60. The diffuser plate support 33 may support edges of the incident surface of the diffuser plate 60. The diffuser plate support 33 may be parallel with the base 41 of the rear chassis 40.

The middle reflector 34 may reflect light emitted from the light source module 100 to the incident surface of the diffuser plate 60. The middle reflector 34 may extend from the diffuser plate support 33 inward and backward at an angle.

The substrate support 35 may affix the substrate 102 against the base 41 of the rear chassis 40. The substrate support 35 may be formed at an inner end of the middle reflector 34. Edges of the substrate 102 may be supported between the substrate support 35 and the base 41.

The frame 32, diffuser plate support 33, middle reflector 34, and substrate support 35 of the middle mold 30 may be integrally formed. A highly reflective material may be provided on the surface of the middle mold 30. The highly reflective material may be provided on the entire surface of the middle mold 30, or may be provided only on the surface of the middle reflector 34. The entire middle mold 30 or the middle reflector 34 of the middle mold 30 may be white to reflect light.

Figure 4:
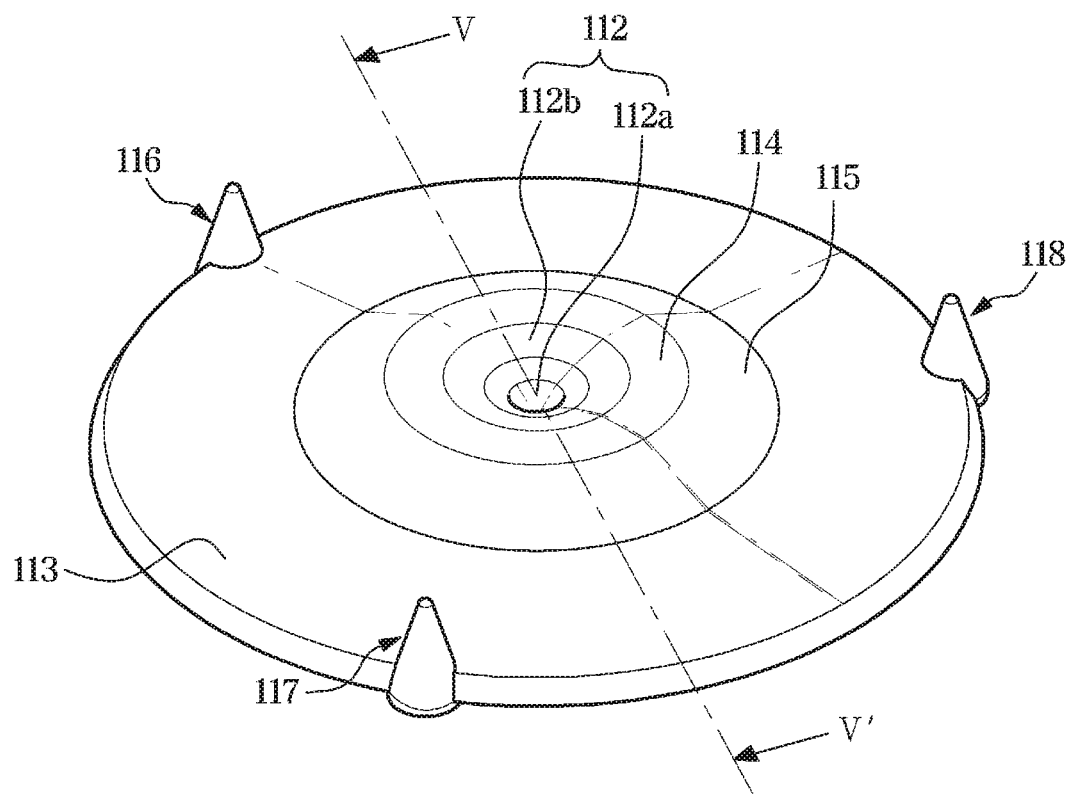
FIG. 4 shows the optical lens shown in FIG. 3.
Figure 5:
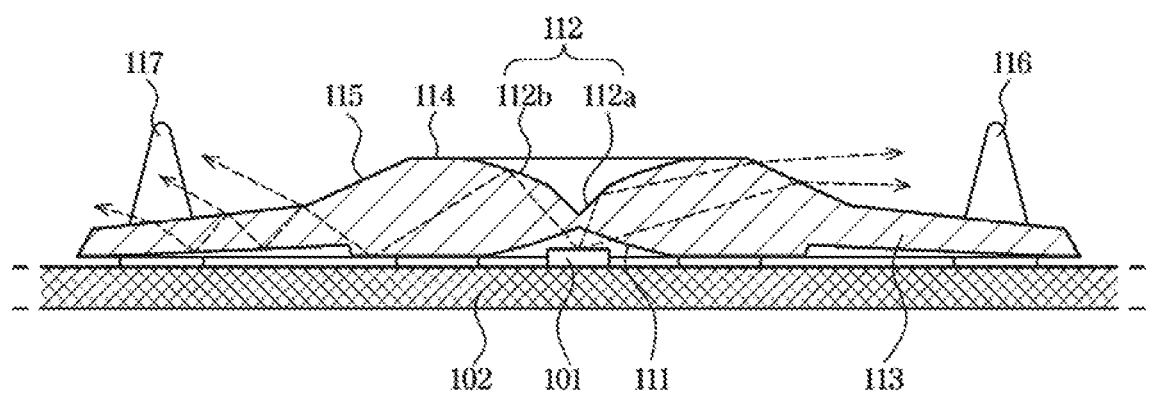
FIG. 5 is a cross-sectional view of the optical lens shown in FIG. 4, the cross-section being taken along line V-V'.

FIG. 4 shows an embodiment of the optical lens 110 shown in FIG. 3. FIG. 5 is a cross-sectional view of the optical lens 110 shown in FIG. 4.

Referring to FIGS. 4 and 5, the optical lens 110 may be generally shaped as a circle. However, the shape of the optical lens 110 is not limited thereto, and the optical lens 110 may have the shape of a square or a polygon such as a pentagon.

The optical lens 110 may be disposed on the substrate 102. The optical lens 110 may cover the light source 101 disposed on the substrate 102. There may be as many optical lenses 110 as the number of the plurality of light sources 101. The optical lens 110 may diffuse light emitted from the light source 101.

The optical lens 110 may include a depression 111 on the rear side of the optical lens 110 to receive the light source 101. The depression 111 may be located at or near the center of the optical lens 110. The depression 111 may be generally shaped like a cone. The light source 101 may be disposed at or near the center of the depression 111. The light source 101 may be disposed at or near the center of the optical lens 110.

The optical lens 110 may include a reflecting portion 112 to reflect light emitted from the light source 101. The reflecting portion 112 may reflect light emitted from the light source 101 in a lateral direction. The reflecting portion 112 may enhance light diffusion properties of the backlight unit. A front surface of the reflecting portion 112 may be inclined towards the front of the optical lens 110 as it extends radially outward from the center of the optical lens 110.

A front surface of the reflecting portion 112 may include a first reflecting surface 112a inclined in the radial direction of the optical lens 110, and a second reflecting surface 112b inclined in the radial direction of the optical lens 110 at a different angle from the first reflecting surface 112a. Since the first and second reflecting surfaces 112a and 112b are inclined at different angles, the optical lens 110 may diffuse the light emitted from the light source 101 at different angles.

The optical lens 110 may include a flat portion 114 extending radially outward from the reflecting portion 112. The flat portion 114 may output light in a different direction than the direction of light reflected on and output from the reflecting portion 112.

The optical lens 110 may include an inclined portion 115 having a front surface that is inclined towards the rear of the optical lens 110 as it extends radially outward from the flat portion 114. The inclined portion 115 may output light in a different direction than the directions of the light reflected on and output from the reflecting portion 112 and the light output from the flat portion 114.

The optical lens 110 may include a diffuser portion 113 having front and rear surfaces that are inclined towards the rear of the optical lens 110 as they extend radially outward from the inclined portion 115. The diffuser portion 113 may be inclined at a more shallow angle than the inclined portion 115. The diffuser portion 113 may reflect light passed the diffuser portion 113 toward the edges of the optical lens 110. Accordingly, the light that has passed through the diffuser portion 113 may be output in a different direction than the light output from the other portions of the optical lens 110.

The optical lens 110 may have enhanced light diffusion properties due to the reflecting portion 112, the flat portion 114, the inclined portion 115, and the diffuser portion 113.

Supports 116, 117, and 118 may protrude toward the diffuser plate 60 may be formed integrally with the optical lens 110. The supports 116, 117, and 118 may be integrally molded with the optical lens 110. Accordingly, the display device 1 according to some embodiments may have a simplified manufacturing process, thereby saving costs.

The supports 116, 117, and 118 may be positioned adjacent to the edges of the optical lens 110. The supports 116, 117, and 118 may be positioned on the edges of the optical lens 110. Accordingly, the display device 1 according to some embodiments may minimize interference of the light output from the optical lens 110 due to the supports 116, 117, and 118.

The supports 116, 117, and 118 may contact and support the diffuser plate 60 when the diffuser plate 60 is deformed by heat as the display device 1 is operated. The supports 116, 117, and 118 may prevent the optical distance, a distance between the optical lens 110 and the diffuser plate 60, from being reduced to a preset length or less due to deformation of the diffuser plate 60. Without the supports 116, 117, and 118, the optical distance, may be reduced to a length that may result in the optical properties of the optical lens 110 not being retained. Accordingly, the supports 116, 117, and 118 may support the diffuser plate 60 for the optical lens 110 to retain its optical properties.

The supports 116, 117, and 118 may prevent the distance between the optical lens 110 and the diffuser plate 60 from being shorter than a preset distance. The supports 116, 117, and 118 may have lengths corresponding to the optical distance between the optical lens 110 and the diffuser plate 60 for retaining optical properties of the optical lens 110. When the optical distance is reduced to a predetermined length or less, the light diffusivity of the optical lens decreases. When the light diffusivity of the optical lens decreases, the uniformity of the light deteriorates.

The supports 116, 117, and 118 may include a first support 116, a second support 117 arranged along the circumference of the optical lens 110 at a distance from the first support 116, and a third support 118 arranged along the circumference of the optical lens 110 at a distance from the second support 117. The mutual distance between the first, second, and third supports 116, 117, and 118 may be substantially the same.

The first, second, and third supports 116, 117, and 118 may have substantially the same size and/or shape. While the three supports 116, 117, and 118 are arranged at regular intervals in FIG. 4, the number and/or arrangement of the supports 116, 117, and 118 is not limited thereto. For example, the supports 116, 117, and 118 may be arranged at different intervals. Furthermore, there may be one, two, or four supports.

The supports 116, 117, and 118 may each have the shape of a cone. The supports 116, 117, and 118 may be arranged such that apexes of the cones face the diffuser plate 60.

Figure 6:
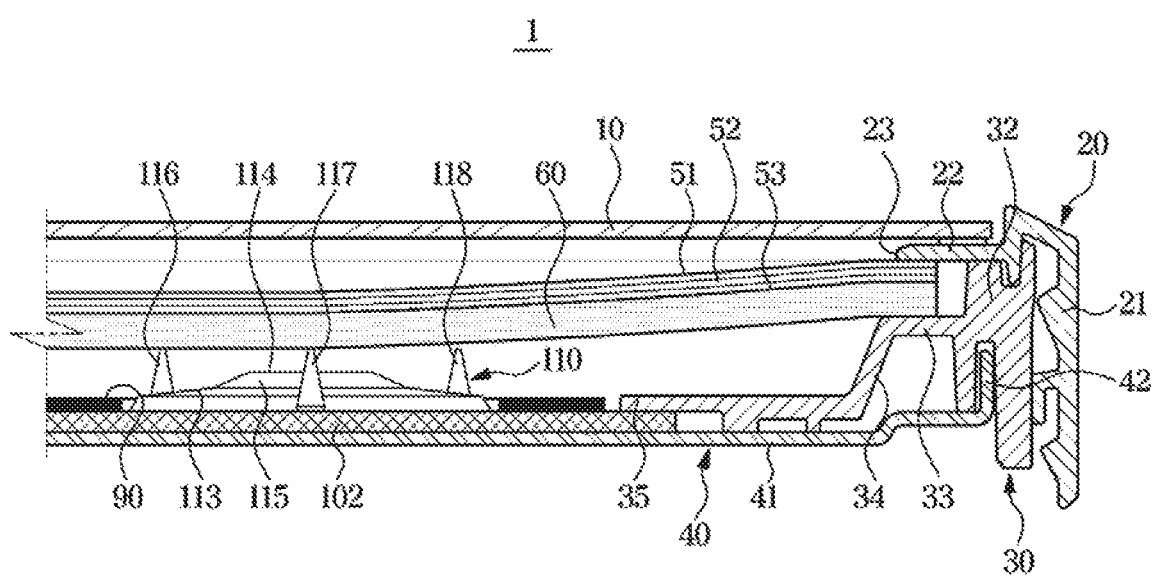
FIG. 6 shows a heat expansion state of a diffusion plate shown in FIG. 3.

FIG. 6 shows a heat expansion state of the diffusion plate shown in FIG. 3.

Referring to FIG. 6, the diffuser plate 60 may be deformed by expanding due to heat produced while the display device 1 is operated. The diffuser plate 60 may bend toward the optical lens 110. As the diffuser plate 60 bends toward the optical lens 110, the optical distance between the diffuser plate 60 and the optical lens 110 is reduced. When the optical distance is reduced to a certain distance or less, the optical properties of the optical lens 110 may not be retained.

In an embodiment, the optical lens 110 may include the supports 116, 117, and 118 to support the diffuser plate 60 in order to prevent reduction of the distance between the diffuser plate 60 and the optical lens 110. When the diffuser plate 60 bends toward the optical lens 110, the supports 116, 117, and 118 support the diffuser plate 60. The supports 116, 117, 118 may support the diffuser plate 60 to prevent the optical distance between the optical lens 110 and the diffuser plate 60 from being reduced to such an extent that the optical properties of the optical lens 110 may be changed.

The embodiment shown in FIGS. 3 through 6 may prevent changes in optical property of the optical lens 110, minimize interference of the light output from the optical lens 110 caused by the supports 116, 117, and 118, enhance light diffusion properties of the optical lens 110, improve its manufacturing process, and save costs.

Figure 7:
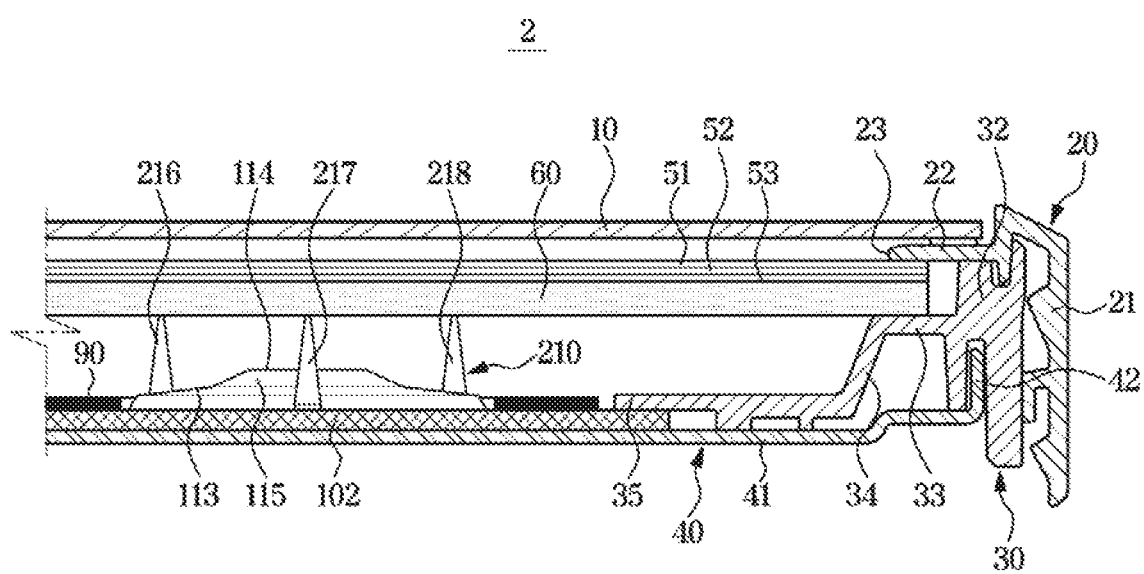
FIG. 7 shows a display device, according to another embodiment.

FIG. 7 shows a display device, according to an embodiment. The same parts as those in FIGS. 1 to 6 will have the same reference numerals, and the detailed description thereof will not be repeated.

An optical lens 210 of the display device 2 may include supports 216, 217, and 218 to support the diffuser plate 60 in order to prevent deformation of the diffuser plate 60. Unlike the embodiment shown in FIG. 3, in the embodiment shown in FIG. 7, the supports 216, 217, and 218 may extend to contact the diffuser plate 60 even before the display device 2 is operated and/or the diffuser plate 60 is deformed. Specifically, the supports 216, 217, and 218 may contact and support the diffuser plate 60 all the times.

With the structure in FIG. 7, the display device 2 may prevent changes in optical properties of the optical lens 210.

Figure 8:
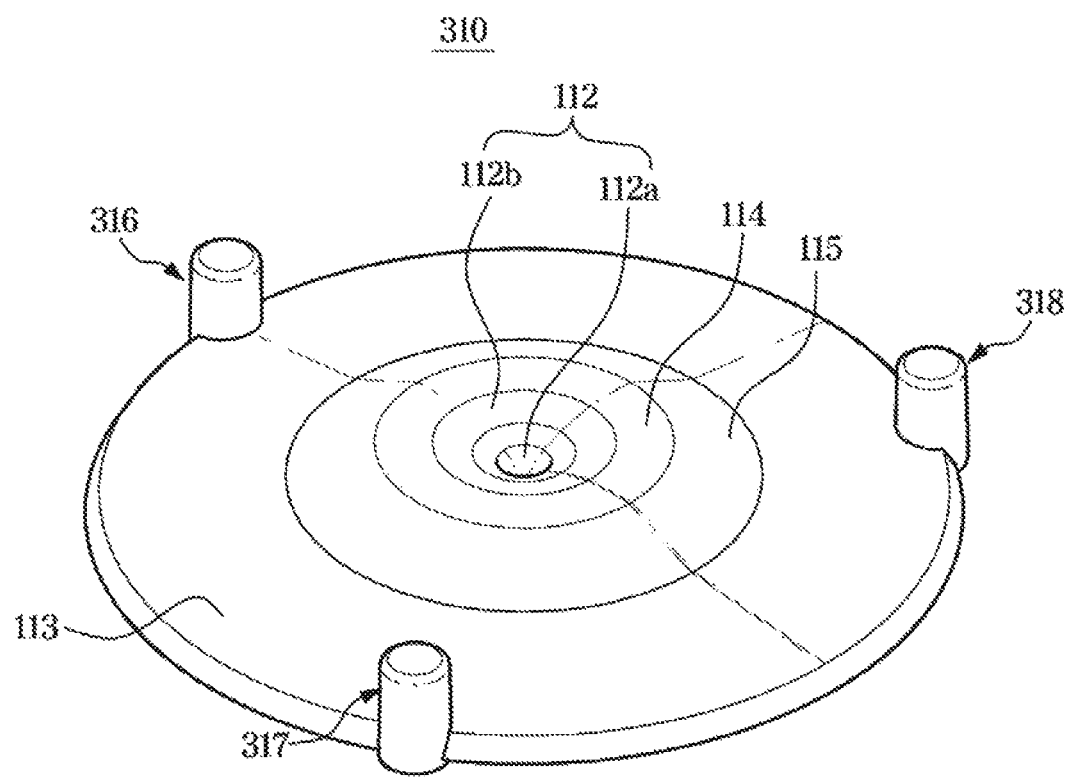
FIG. 8 shows an optical lens, according to another embodiment.
Figure 9:
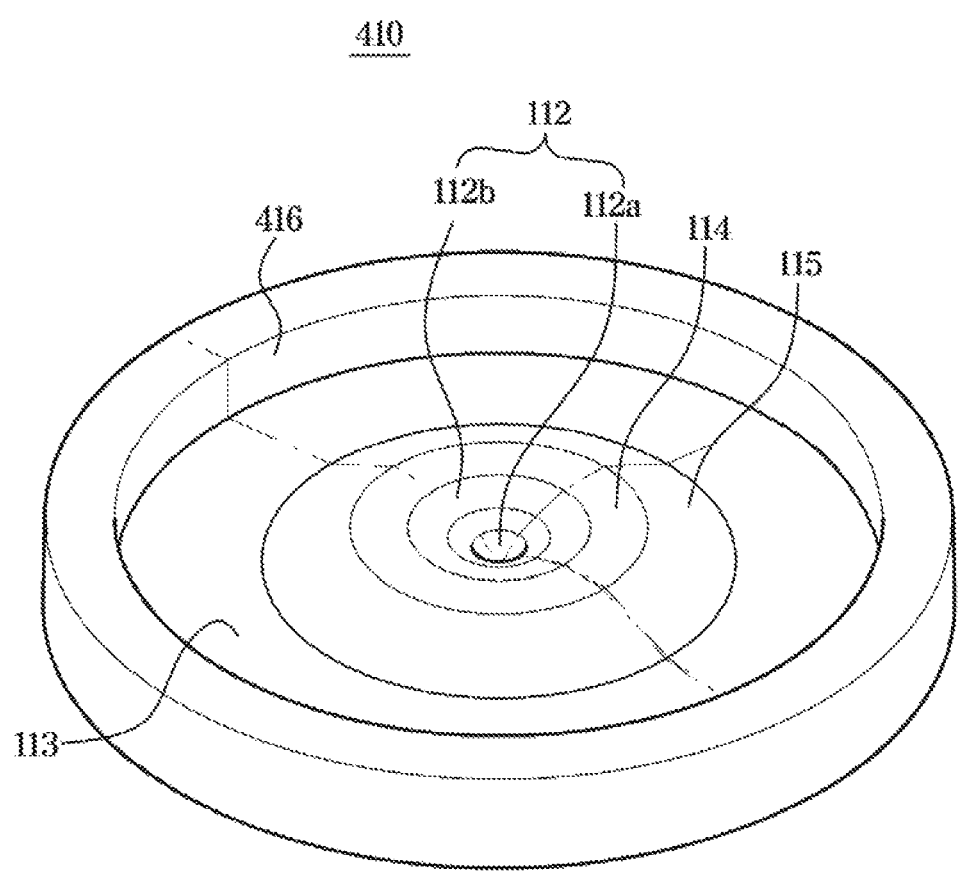
FIG. 9 shows an optical lens, according to another embodiment.
Figure 10:
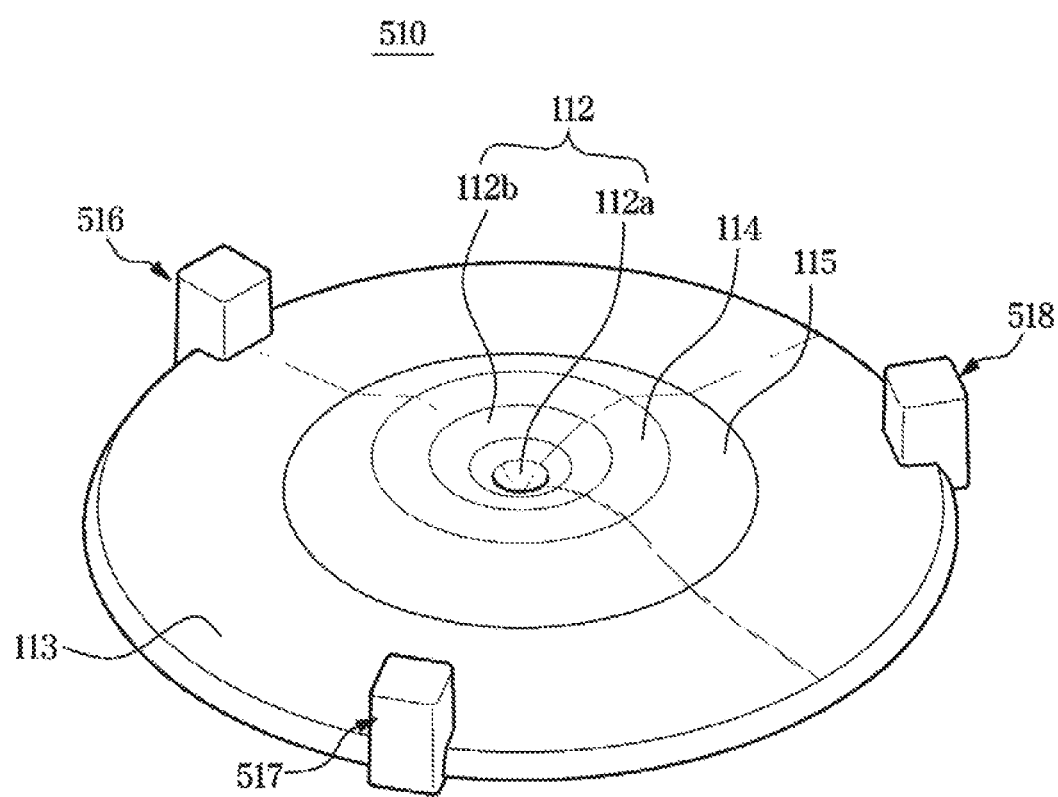
FIG. 10 shows an optical lens, according to another embodiment.
Figure 11:
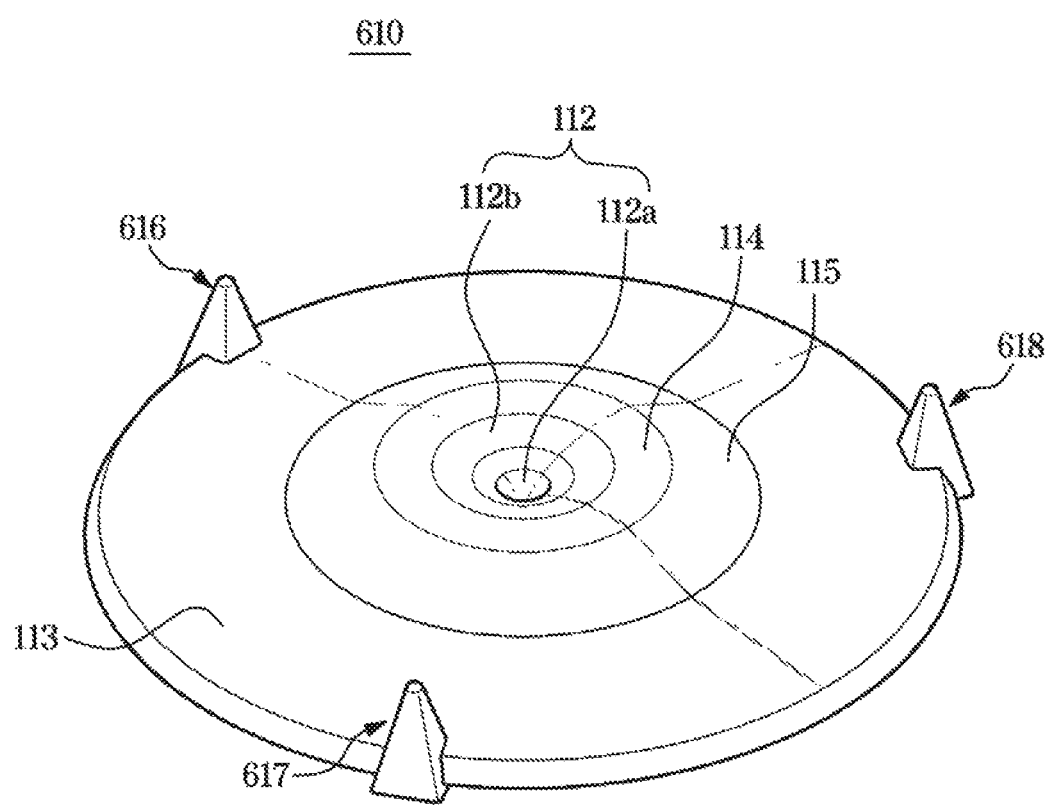
FIG. 11 shows an optical lens, according to another embodiment.
Figure 12:
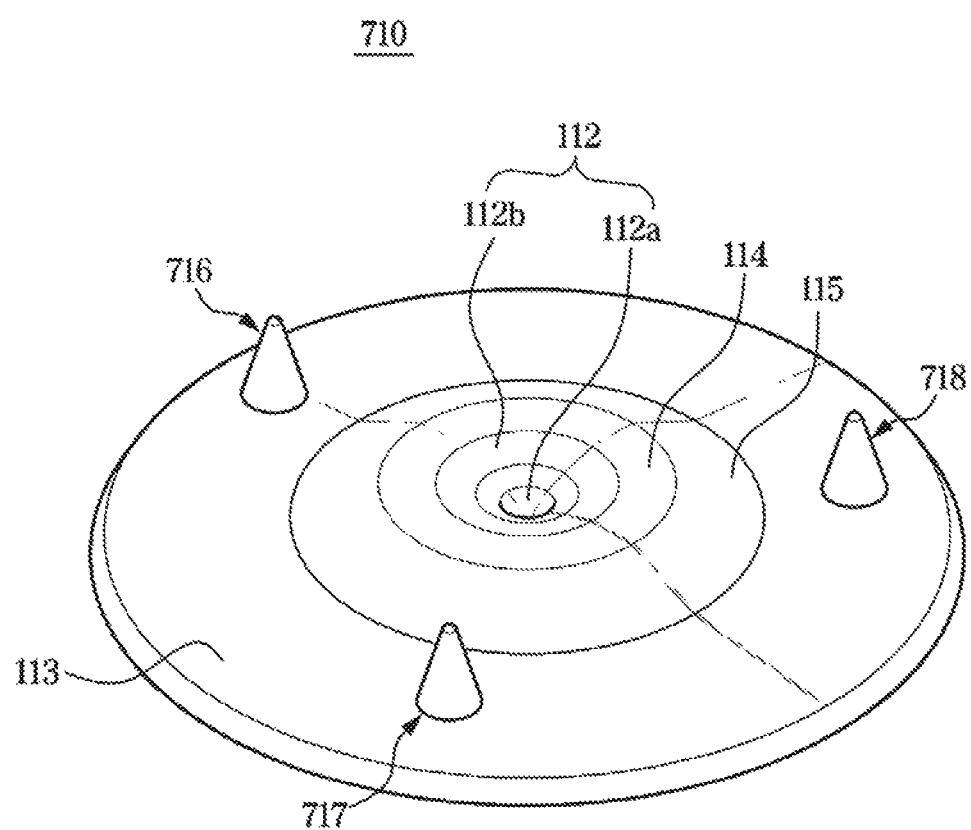
FIG. 12 shows an optical lens, according to another embodiment.

FIG. 8 shows an optical lens, according to an embodiment. FIG. 9 shows an optical lens, according to yet another embodiment. FIG. 10 shows an optical lens, according to yet another embodiment. FIG. 11 shows an optical lens, according to yet another embodiment. FIG. 12 shows an optical lens, according to yet another embodiment.

Referring to FIGS. 8 through 12, shapes and locations of various supports of different embodiments of the optical lens will be described. The same parts as those in FIGS. 1 through 6 will have the same reference numerals, and the detailed description thereof will not be repeated. The shapes and locations of the supports of the optical lens are not limited to the following description.

Referring to FIG. 8, supports 316, 317, and 318 of an optical lens 310 may have a cylindrical shape. Upper surfaces of the cylinders of the supports 316, 317, and 318 may support the diffuser plate 60.

Referring to FIG. 9, a support 416 of an optical lens 410 may extend along the circumference of the optical lens 410. The support 416 may be continuously formed along the circumference of the optical lens 410.

Referring to FIG. 10, supports 516, 517, and 518 of an optical lens 510 may each be shaped as a square pillar. Upper surfaces of the square pillars of the supports 516, 517, and 518 may support the diffuser plate 60.

Referring to FIG. 11, supports 616, 617, and 618 of an optical lens 610 may each be shaped as a quadrangular pyramid. Apexes of the quadrangular pyramids of the supports 616, 617, and 618 may support the diffuser plate 60.

Referring to FIG. 12, supports 716, 717, and 718 of an optical lens 710 may be located on the diffuser plate 113. Unlike the supports 116, 117, and 118 shown in FIG. 4, the supports 716, 717, and 718 shown in FIG. 12 may be located a distance radially inward from the peripheral edge of the optical lens 710.

According to one or more embodiments, a display device may include a support and an optical lens, which are formed integrally, thereby reducing the manufacturing costs.

With the support and the optical lens formed integrally, the display device may be easily manufactured.

According to one more embodiments, a display device may minimize deformation of a diffuser plate and/or a diffuser sheet due to heat produced from a backlight unit, and accordingly, keep a constant optical distance (OD).

According to one or more embodiments, a display device may have a support positioned on a peripheral edge of an optical lens, thereby minimizing the influence of the support on diffused light and accordingly, enhancing a light diffusion property.

Embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

What is claimed is:

1. A display device comprising:
a display panel;
a light source configured to emit light toward the display panel;
a diffuser plate configured to diffuse incident light, the diffuser plate being disposed between the light source and the display panel;
an optical lens configured to diffuse the light emitted by the light source; and
at least one support integrally provided on the optical lens to protrude toward the diffuser plate,
wherein the at least one support is formed at an edge of the optical lens to minimize interference of light output from the optical lens to the diffuser plate.

2. The display device of claim 1, wherein the at least one support is configured to support the diffuser plate when the diffuser plate is deformed.

3. The display device of claim 1, wherein the at least one support contacts the diffuser plate when the diffuser plate is in an non-deformed state.

4. The display device of claim 1, wherein the optical lens comprises:
a rear surface defining a depression configured to receive the light source; and
a reflecting portion defining a reflecting surface located in front of the depression, the reflecting surface being configured to reflect light emitted from the light source.

5. The display device of claim 4, wherein the reflecting surface comprises:
a first reflecting surface inclined in a radial direction of the optical lens; and
a second reflecting surface inclined in the radial direction of the optical lens at a different angle than the first reflecting surface.

6. The display device of claim 5, wherein the first reflecting surface and the second reflecting surface are inclined toward a front of the optical lens as the first reflecting surface and the second reflecting surface extend radially outward.

7. The display device of claim 1, wherein the optical lens comprises a diffuser portion extending in a radial direction, the diffuser portion being inclined toward a back of the optical lens as the diffuser portion extends radially outward.

8. The display device of claim 7, wherein the at least one support is provided on the diffuser portion.

9. The display device of claim 1, wherein the at least one support comprises:
a first support;
a second support positioned along the edge of the optical lens at a distance from the first support; and
a third support positioned along the edge of the optical lens, the third support being separated from the second support by a distance equal to the distance between the first support and the second support, and
wherein the third support is separated from the first support by a distance equal to the distance between the third support and the second support.

10. The display device of claim 1, wherein the at least one support extends along a peripheral edge of the optical lens.

11. The display device of claim 1, wherein the at least one support has a shape of one of a cone, a cylinder, a square pillar, and a quadrangular pyramid.

12. The display device of claim 1, wherein the at least one support is configured to prevent a distance between the optical lens and the diffuser plate from being shorter than a distance where a light diffusivity of the optical lens decreases.

13. The display device of claim 1, wherein the at least one support has a length corresponding to an optical distance between the optical lens and the diffuser plate to retain optical properties of the optical lens.

14. A display device comprising:
a display panel;
a light source configured to emit light toward the display panel;
an optical member disposed between the light source and the display panel; and
an optical lens configured to diffuse the light emitted by the light source,
wherein the optical lens comprises:
a reflecting portion defining a forward-facing reflecting surface inclined toward a front to the optical lens as the reflecting portion extends radially outward;
a diffuser portion located radially outside of the reflecting portion, the diffuser portion being inclined toward a back of the optical lens as the diffuser portion extends radially outward; and at least one support protruding from an edge of the optical lens toward the optical member to minimize interference of light output from the optical lens to the optical member.

15. The display device of claim 14, wherein the at least one support is configured to support the optical member.

16. The display device of claim 14, wherein the at least one support comprises a first support and a second support arranged along the edge of the optical lens, the second support being separated from the first support.

17. The display device of claim 14, wherein the at least one support has a length corresponding to a distance between the optical member and the optical lens to retain optical properties of the optical lens.

18. The display device of claim 14, wherein the at least one support has a shape of one of a cone, a cylinder, a square pillar, and a quadrangular pyramid.

19. The display device of claim 14, wherein the optical member comprises at least one of a diffuser plate, a quantum dot sheet, a diffuser sheet, a prism sheet, a protection sheet, or a reflective polarizing sheet.

20. A display device comprising:
a display panel;
a light source configured to emit light toward the display panel;
a diffuser plate disposed between the light source and the display panel; and
an optical lens configured to diffuse the light emitted by the light source; and
a support integrally formed and protruding toward the diffuser plate from an edge of the optical lens to minimize interference of light output from the optical lens to the diffuser plate,
wherein the support is configured to prevent a variation in distance between the optical lens and the diffuser plate that will cause optical properties of the optical lens to change.

* * * * *